(12) United States Patent
Pino et al.

(10) Patent No.: US 9,937,822 B2
(45) Date of Patent: Apr. 10, 2018

(54) LATCH IN PARTICULAR FOR A RECLINING BACKREST OF A SEAT OF A VEHICLE

(71) Applicant: PROMA S.P.A., San Nicola La Strada (IT)

(72) Inventors: Nicola Giorgio Pino, Caserta (IT); Andrea Massimo Fusco, San Nicola La Strada (IT)

(73) Assignee: PROMO S.P.A., San Nicola la Strada (CE) (IT)

( * ) Notice: Subject to any disclaimer, the term of this patent is extended or adjusted under 35 U.S.C. 154(b) by 53 days.

(21) Appl. No.: 14/775,355

(22) PCT Filed: Mar. 7, 2014

(86) PCT No.: PCT/IB2014/059517
§ 371 (c)(1),
(2) Date: Sep. 11, 2015

(87) PCT Pub. No.: WO2014/141016
PCT Pub. Date: Sep. 18, 2014

(65) Prior Publication Data
US 2016/0023576 A1    Jan. 28, 2016

(30) Foreign Application Priority Data
Mar. 12, 2013   (IT) .............................. TO2013A0194

(51) Int. Cl.
*B60N 2/60* (2006.01)
*B60N 2/22* (2006.01)
(Continued)

(52) U.S. Cl.
CPC ........... *B60N 2/2245* (2013.01); *B60N 2/206* (2013.01); *B60N 2/366* (2013.01); *B60N 2/682* (2013.01)

(58) Field of Classification Search
CPC ...... B60N 2/2245; B60N 2/206; B60N 2/366; B60N 2/682
(Continued)

(56) References Cited

U.S. PATENT DOCUMENTS 3,666,314 A * 5/1972 Makinen .................. B60N 2/10
                                                   296/65.17
3,788,685 A * 1/1974 Leichtl ..................... B60N 2/20
                                                    180/286
(Continued)

FOREIGN PATENT DOCUMENTS

| DE | 102008064458 A1 | 7/2010 |
|----|-----------------|--------|
| EP | 2116415 A1 | 11/2009 |
| WO | WO 2011/043831 A1 | 4/2011 |

OTHER PUBLICATIONS

International Search Report for corresponding International Application No. PCT/IB2014/059517, dated Apr. 28, 2014.
(Continued)

*Primary Examiner* — Syed A Islam
(74) *Attorney, Agent, or Firm* — Merchant & Gould P.C.

(57) ABSTRACT

A latch includes a support structure to be fitted to the frame (F) of a backrest of a seat; and a coupling mechanism associated with the support structure and adapted to be coupled to a fixed striker (R) in a releasable manner when the backrest is in a substantially straight position. The latch also includes an elongated member, which, on one side, is adapted to be firmly and directly coupled to the support structure and, on the other side, is adapted to be firmly and directly coupled to the frame (F), without obstructing the operation of the coupling mechanism.

10 Claims, 7 Drawing Sheets

(51) Int. Cl.
   *B60N 2/36* (2006.01)
   *B60N 2/20* (2006.01)
   *B60N 2/68* (2006.01)

(58) Field of Classification Search
   USPC .................................................. 297/378.13
   See application file for complete search history.

(56) References Cited

U.S. PATENT DOCUMENTS

| | | | | |
|---|---|---|---|---|
| 7,073,861 B2* | 7/2006 | Ichikawa | ............. | B60N 2/3013 297/378.1 |
| 7,152,926 B2* | 12/2006 | Wrobel | ............. | B60N 2/01541 296/65.03 |
| 7,188,906 B2* | 3/2007 | Christoffel | ......... | B60N 2/01583 297/336 |
| 7,410,217 B2* | 8/2008 | Inoue | ..................... | B60N 2/366 297/378.13 |
| 7,578,558 B2* | 8/2009 | Tanaka | ................. | B60N 2/2245 297/378.13 |
| 7,641,282 B2* | 1/2010 | Hinata | ................. | B60N 2/2245 297/216.14 |
| 7,740,317 B2* | 6/2010 | Yamada | ................ | B60N 2/366 296/65.17 |
| 8,511,723 B2* | 8/2013 | Otsuka | ............... | B60N 2/01583 292/216 |
| 8,590,973 B2* | 11/2013 | Matsuura | ............... | B60N 2/366 292/216 |
| 8,608,245 B2* | 12/2013 | Wieclawski | ........... | B60N 2/366 292/137 |
| 8,757,678 B2 | 6/2014 | Heeg et al. | | |
| 8,905,475 B2* | 12/2014 | Schenten | ............. | B60N 2/2245 297/232 |
| 8,926,019 B2* | 1/2015 | Lee | ........................ | B60N 2/366 297/376 |
| 9,039,089 B2* | 5/2015 | Ohba | ................... | B60N 2/2352 297/335 |
| 9,452,690 B2* | 9/2016 | Kamper | ................... | B60N 2/36 |
| 2008/0061617 A1 | 3/2008 | Zielinski et al. | | |
| 2012/0133188 A1* | 5/2012 | Wieclawski | ......... | B60N 2/2245 297/378.13 |
| 2013/0033080 A1* | 2/2013 | Sei | .......................... | B60N 2/68 297/353 |

OTHER PUBLICATIONS

Written Opinion for corresponding International Application No. PCT/IB2014/059517, dated Apr. 28, 2014.

\* cited by examiner

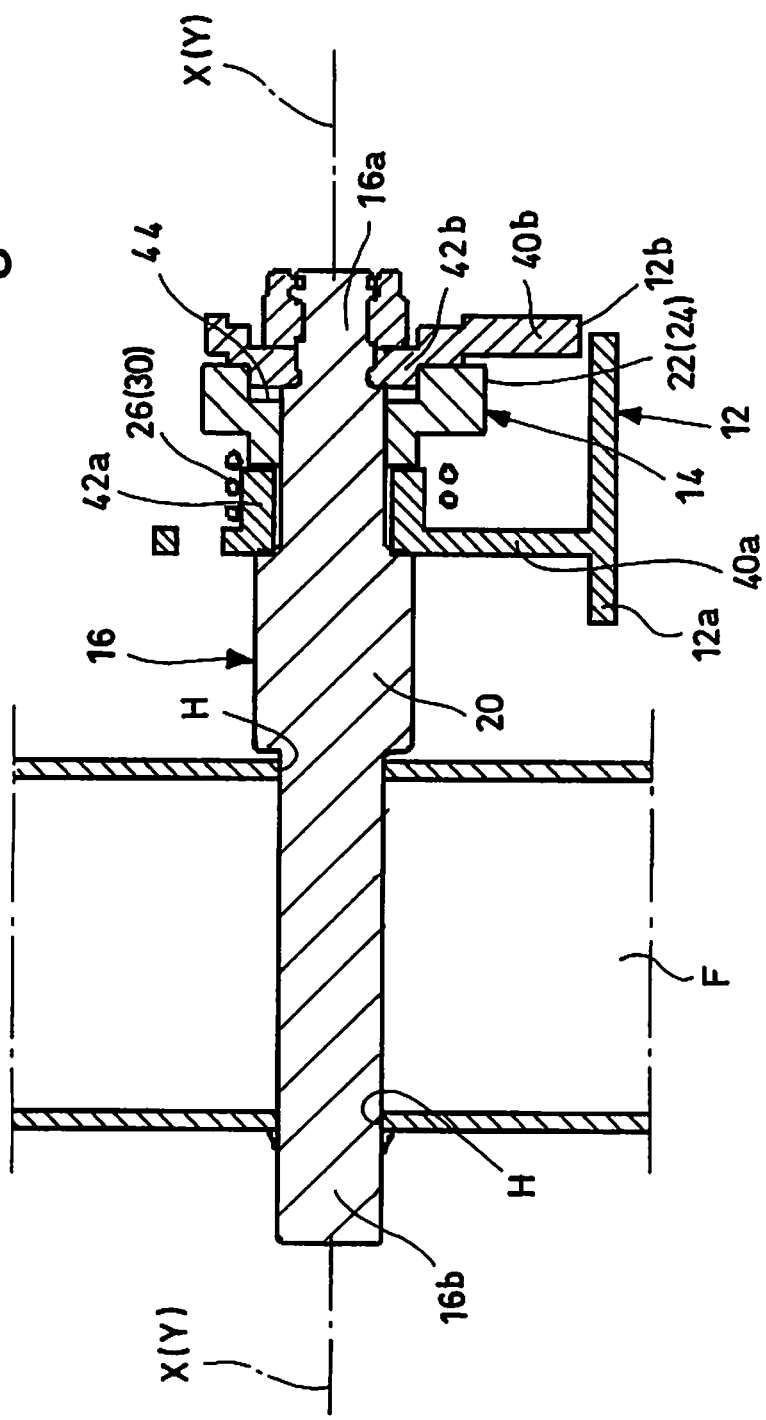

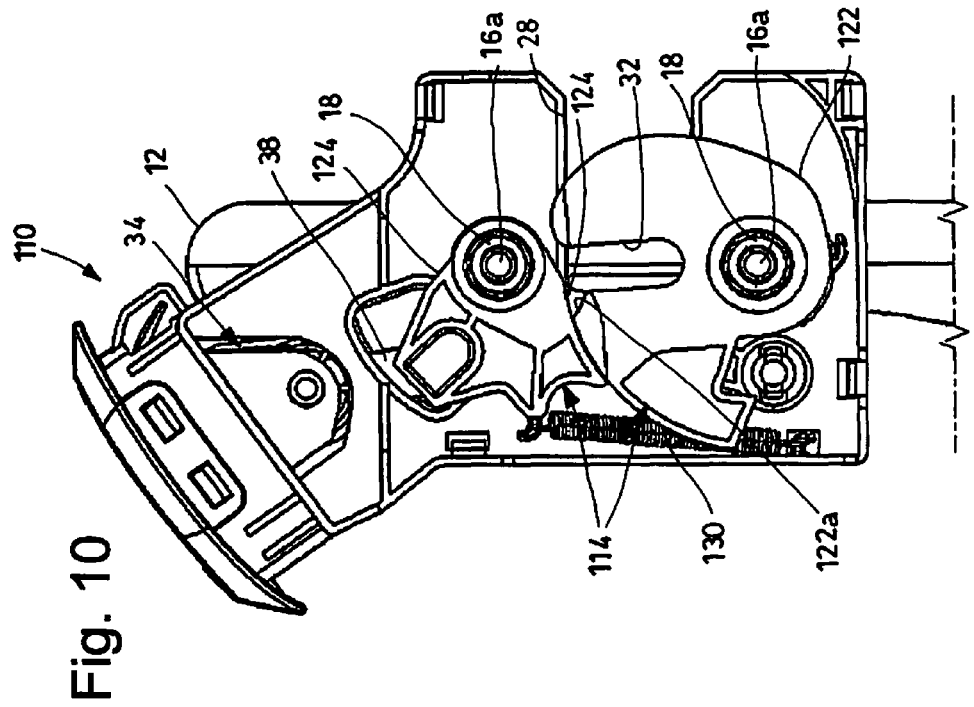
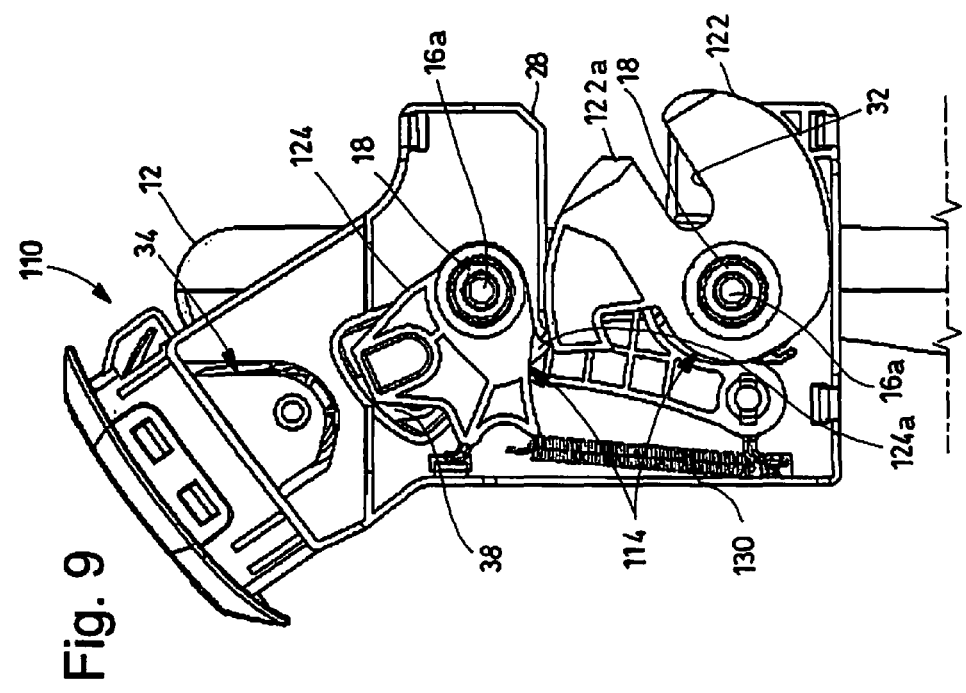

LATCH IN PARTICULAR FOR A RECLINING BACKREST OF A SEAT OF A VEHICLE

This application is a National Stage Application of International Application No. PCT/IB2014/059517, filed 7 Mar. 2014, which claims benefit of Serial No. TO2013A000194, filed 12 Mar. 2013 in Italy, and which applications are incorporated herein by reference. To the extent appropriate, a claim of priority is made to each of the above disclosed applications.

TECHNICAL FIELD

The present invention is relative to a latch, in particular for a reclining backrest of a seat of a vehicle.

TECHNOLOGICAL BACKGROUND

More specifically, the present invention is related to a latch for a reclining backrest of a seat of a vehicle, said latch including:
- a support structure to be fitted to the frame of said backrest; and
- a coupling mechanism, which is associated with said support structure and is adapted to be coupled to a fixed striker in a releasable manner, when the backrest is in a substantially straight position.

Latches of the type described above are typically used in the rear seats of a car, where the backrests can be reclined between a folded position, as much as possible towards a substantially horizontal orientation, and a substantially straight position having a substantially vertical orientation. In this way, the space to be used by the baggage compartment arranged in the rear part of the car can be increased, thus allowing a more comfortable arrangement of particularly bulky loads that otherwise could not be transported inside the vehicle.

Though, the possibility to recline the backrest makes it necessary for constructors to use suitable devices able to firmly lock the backrest in its position, when it is arranged in its straight condition. As a matter of fact, if the backrests were not correctly locked in position in their straight condition, possible passengers seating in the rear seats could be thrown of their seats in case of braking. Furthermore, even if there were no passengers seating in the rear seats, the braking could cause the load contained in the baggage compartment to push the backrests forward, thus not only causing the backrests to be folded forward, but also possibly allowing the load to reach the passenger compartment with potential serious consequences for the safety of the driver or of the other passengers.

For this reason, cars are typically provided with latches, whose coupling mechanism is able to constrain, in a stable but releasable manner, the backrest of the rear seat, in its straight condition, to a fixed striker arranged on the frame of the vehicle. Clearly, for this reason, latches must be firmly mounted on the frame of the backrest of the vehicle, so that the stresses to which they are subject during their use reduce as much as possible the risk of a possible undesired detachment thereof from the backrest itself. As a matter of fact, this detachment would cause the backrest to fold forward, with all the problematic and dangerous consequences mentioned above.

Though, latches of the type described above have some drawbacks.

A drawback is due to the fact that, in order to ensure a firm fixing and an adequate resistance to stresses, the above-mentioned latches are constrained to the frame of the backrest, typically with the use of numerous elements and components, such as brackets, plates and the like. Owing to the above, on the one hand, the installation of the latch is burdensome in terms of time needed to connect the numerous components and, on the other hand, the manufacturing of the latch is expensive in terms of costs for producing said components.

SUMMARY OF THE INVENTION

The object of the present invention is to provide an improved latch, which, in particular, is able to solve these and other drawbacks of the prior art and which, at the same time, can be manufactured in a simple and economic fashion.

According to the present invention, this and other objects are reached by a latch having the features set forth above.

BRIEF DESCRIPTION OF THE DRAWINGS

Further features and advantages of the present invention will be best understood upon perusal of the following detailed description, which is provided by way of example and is not limiting, with reference, in particular, to the accompanying drawings, wherein:

FIG. 8 is a longitudinally sectioned view of the latch shown in the previous figures;

FIGS. 9 and 10 are views similar to the ones shown in FIGS. 6 and 7, but they show a latch manufactured according to a further embodiment of the present invention.

DETAILED DESCRIPTION OF THE INVENTION

With reference, in particular, to the figures from 1 to 8, number 10 indicates, as a whole, a latch manufactured according to a preferred explanatory embodiment of the present invention.

Figure 1:
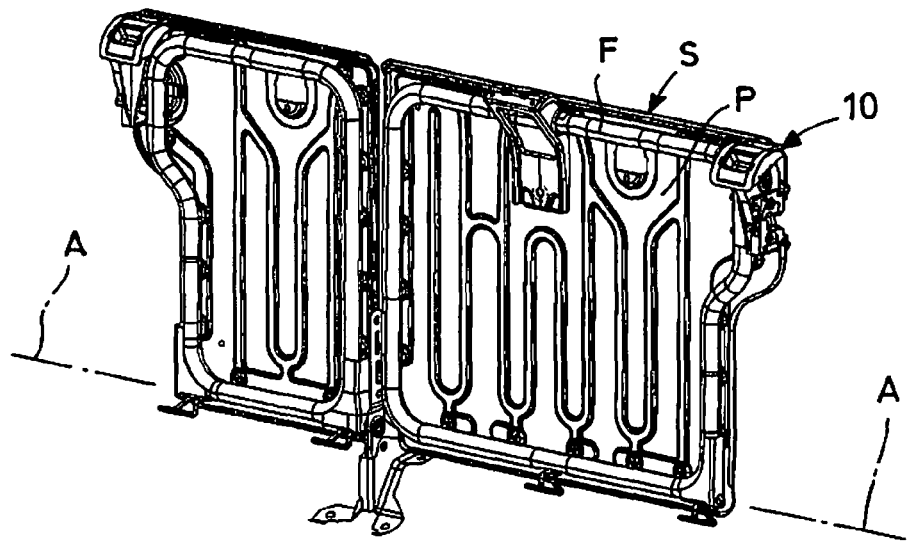
FIG. 1 is a prospective view of a rear seat of a car having a reclining backrest provided with a latch manufactured according to an explanatory embodiment of the present invention.
Figure 2:
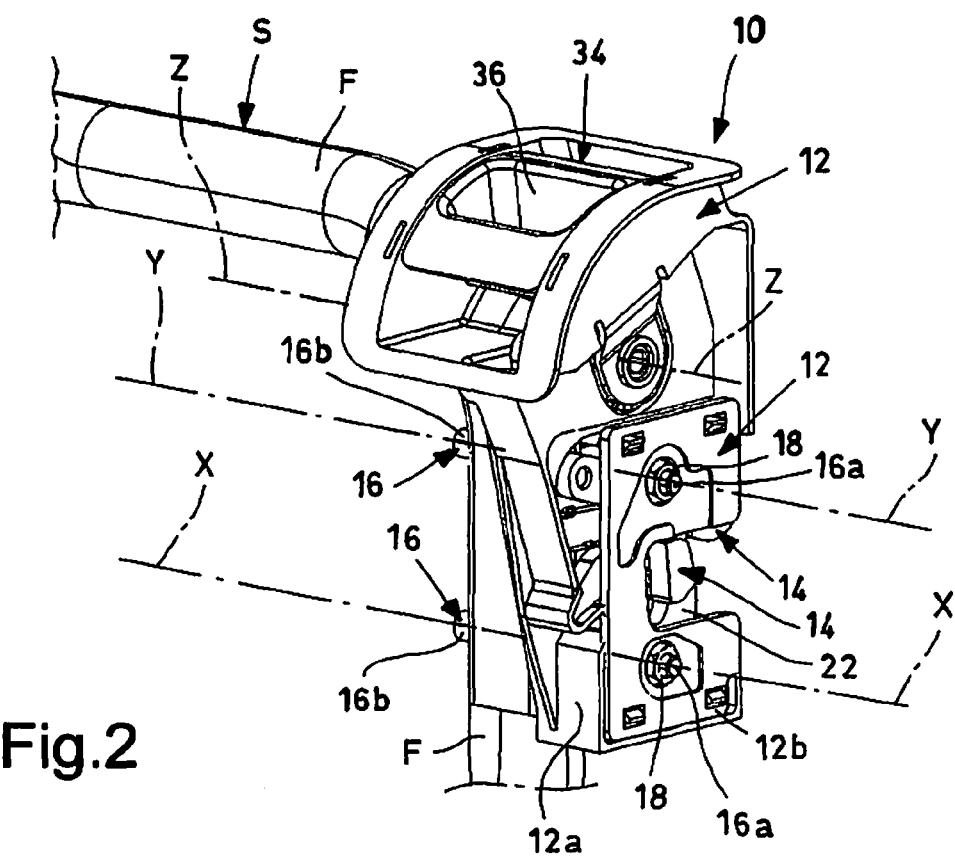
FIG. 2 is an enlarged prospective view of the latch shown in FIG. 1.

In this embodiment, latch 10 is shown mounted on a reclining backrest S belonging to a seat of a vehicle, such as a rear seat of a car. In particular, backrest S is pivotable around a horizontal axis A-A arranged on the lower side, so as to shift from a substantially straight position (FIG. 1), during its normal operation, to a position (not shown) in which it is folded forward towards the sitting plane of the seat. In the substantially straight position, backrest S is adapted to receive and support the back of a user seating on the seat. On the other hand, in the folded position, backrest S allows access to the area arranged behind the seat itself, in particular with the possibility to access the baggage compartment of the vehicle on which the seat is installed, thus increasing the loading volume of the baggage compartment itself.

In this embodiment, backrest S comprises a frame or skeleton F, which is mounted so as to pivot, in particular, around the horizontal axis A-A and on which there is installed, on the rear side, a panel P that is designed to separate the area arranged behind backrest S, such as the baggage compartment, and the area arranged in front of backrest S, such as the baggage compartment.

Preferably, frame F is manufactured by means of one or more tubular or box-like segments, which are caused to be integral to one another, so as to define the peripheral profile of the backrest and form its bearing structure.

In the embodiment shown, frame F is made of a metal material, for example steel (preferably high-strength steel) or aluminum (or alloys thereof).

Figure 3:
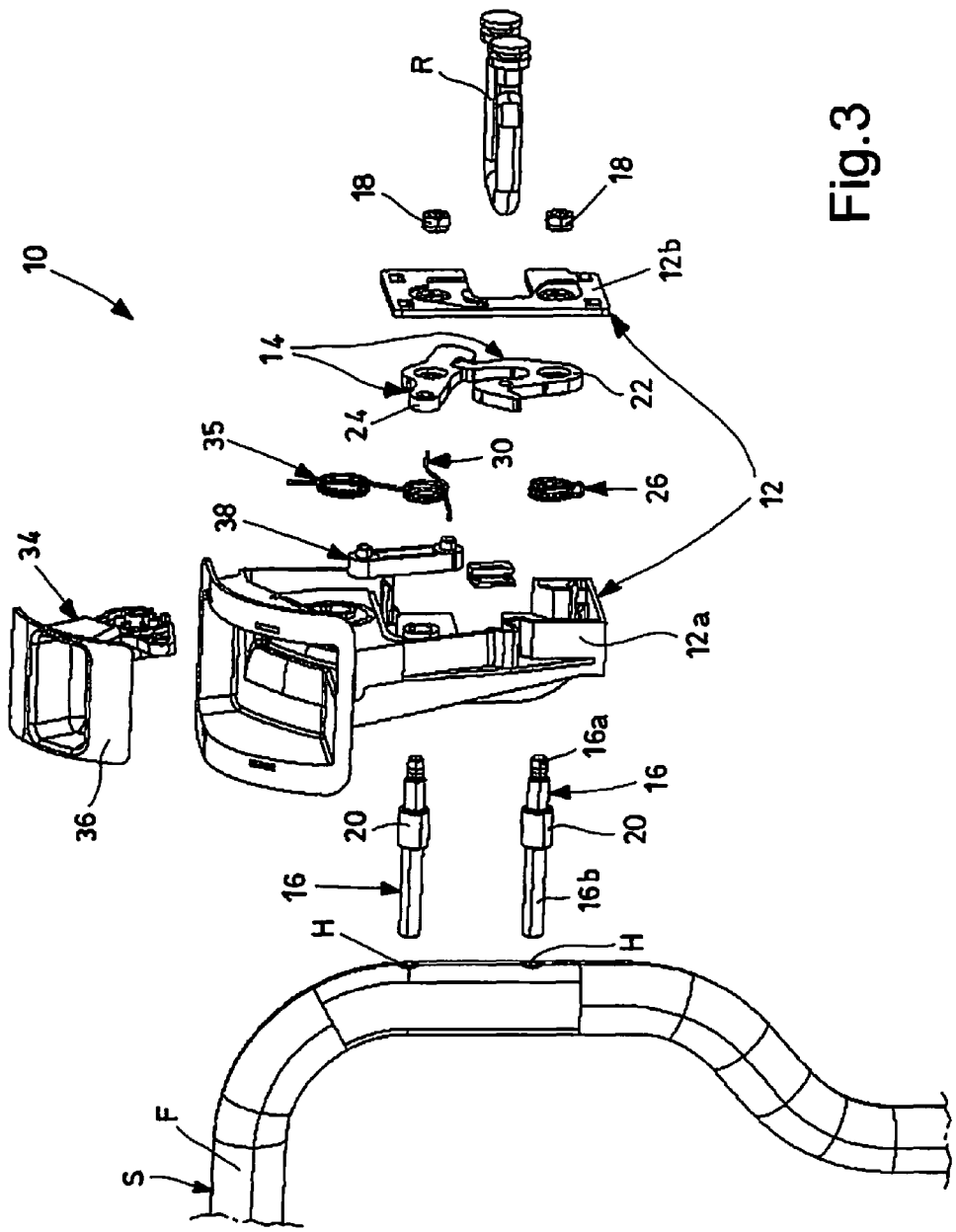
FIG. 3 is an exploded prospective view of the latch shown in the previous figures.
Figure 5:
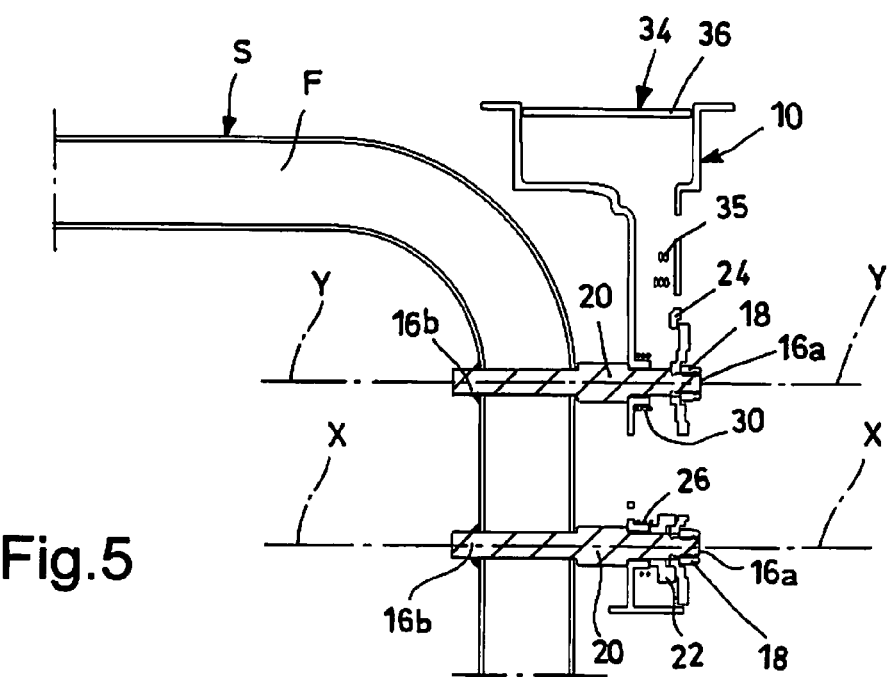
FIG. 5 is a front elevation view sectioned along a substantially longitudinal plane of the latch shown in the previous figures.

With reference, in particular, to the figures from 2 to 8, latch 10 comprises:
- a support structure 12 to be fitted to frame F of said backrest S; and
- a coupling mechanism 14, which is typically made of a metal material (for example steel), is associated with said support structure 12 and is adapted to be coupled to a fixed striker R in a releasable manner (FIGS. 3, 5 and 6), when said backrest S is in a substantially straight position.

In this embodiment, the support structure comprises—advantageously but not necessarily—an internally hollow casing 12, which is adapted to house, mounted therein, the coupling mechanism 14. Preferably, casing 12 comprises, in turn, a laterally open hollow body 12a, which is closed by a lid or plate 12b, which is laterally fixed thereto, thus creating, in particular, a "sandwich" arrangement with coupling mechanism 14. Though, in further embodiments, a support structure can be used, which only comprises a bearing member for the coupling mechanism, for example the sole plate mentioned above, without including other elements designed to make up a casing suited to protect or externally coat the coupling mechanisms.

In this embodiment, hollow body 12a of casing 12 is made of a polymer material, for example of the thermoplastic type. In particular, the above-mentioned thermoplastic material comprises polyamide, for example nylon (e.g. of the PA 6 type).

In this embodiment, lid or plate 12b of casing 12 is made of a metal material, for example steel. In particular, the steel used for this purpose is of the high-strength type, such as S500 MC steel.

Latch 10 comprises, furthermore, at least one elongated member 16, which is able to extend through support structure 12. Furthermore, elongated member 16, on one side, is adapted to be firmly and directly coupled to support structure 12 and, on the other side, is adapted to be firmly and directly coupled to frame F, without obstructing the operation of coupling mechanism 14.

In other words, elongated member 16 simultaneously permits a direct connection, namely without the need for further components and intermediate elements (for example by means of brackets, sleeves, plates and the like), on one side, to support structure 12 and, on the other side, to frame F of the backrest, moreover without substantially reducing performances in terms of resistance and stability of the connection existing between backrest S and latch 10.

Preferably, frame F is provided with a pair of transverse and aligned through holes H, through which elongated member 16 can be inserted.

In particular, elongated member 16 is adapted to at least partially extend through and be coupled to frame F.

In this embodiment, elongated member 16 is shaped like a rod, preferably with a cylindrical shape. Elongated member 16 can be provided with diameter or thickness changes along its length, as explained in detail below. Advantageously but not necessarily, elongated member 16 is manufactured as one single piece.

In this embodiment, the direct connection between elongated member 16 and support structure 12 is obtained by constraining a portion 16a of the elongated member 16 that projects towards the outside of support structure 12. In particular, the portion 16a is an end of the elongated member 16. Preferably, elongated member 16—with its portion 16a—extends through a pair of transverse and aligned through openings (not numbered), which are each obtained in the support structure, for example one of them is made in hollow body 12a and the other one is correspondingly made in lid 12b.

By way of example, the above-mentioned direct connection can be obtained by mounting a nut 18 on said portion 16a, in particular by coupling them by means of a mutual thread. Alternatively, the direct connection can be obtained by riveting, clinching or welding portion 16a onto support structure 12.

In this embodiment, the direct connection between elongated member 16 and frame F can be obtained in a manner that is similar to the one described above with reference to the direct connection between elongated member 16 and support structure 12. In other words, the direct connection between elongated member 16 and frame F is adapted to be obtained by constraining a further portion 16b of elongated member 16 that project towards the outside (and preferably extends through through holes H aligned with one another) of frame F, for example on the opposite side relative to portion 16a. In particular, the further portion 16b is an end of elongated member 16.

By way of example, the above-mentioned direct connection can be obtained by mounting a further nut on said portion 16b, in particular by coupling them by means of a mutual thread. Alternatively, the direct connection can be obtained by riveting, clinching or welding further portion 16b onto frame F.

Preferably, elongated member 16 comprises a wide spacer 20, which is adapted to be interposed between support structure 12 and frame F, so as to keep them spaced apart from one another, so that striker R and mechanism 14 can be coupled. More in detail, striker R can project (from the frame of the constraint) on the rear side or laterally relative to backrest S and, thanks to spacer 20, backrest S and striker R can be kept mutually spaced apart, thus avoiding an undesired interference during the movement. Therefore, spacer 20, which is "built-in" in elongated member 16, prevents further components designed to fulfill its function from being used in latch 10.

In the embodiment shown, each elongated member 16 is made of a metal material, for example steel.

In particular, mechanism 14 comprises at least one rotating element, which is able to work by rotating around a respective pivoting axis. The above-mentioned at least one rotary element is passed through, with freedom of rotation, by the respective elongated member 16 in correspondence to said pivoting axis.

In this embodiment, the mechanism 14 comprises a pair of rotating elements 22 and 24, which cooperate with one another and are able to work by rotating around respective pivoting axes X-X and Y-Y. Preferably, axes X-X and Y-Y are parallel to one another. Preferably, furthermore, rotating elements 22, 24 are substantially plate-shaped and lie on a same pivoting plane, which is substantially perpendicular to axes X-X and Y-Y. In this way, the general structure of the latch gains 10 transverse compactness.

In this embodiment, rotating elements 22 and 24 are made of a metal material, for example steel (or alloys thereof). In particular, the steel comprises a steel alloyed with manganese and/or chromium (so-called Mn—Cr steel).

In particular, at least one of rotating elements 22, 24 is passed through by the respective elongated member 16 in correspondence to the respective rotation axis X-X, Y-Y, with freedom of rotation relative to elongated member 16 itself. In this way, the space taken up by latch 10 is further reduced and, at the same time, the correct operation of mechanism 14, especially the rotation of rotating element 22, 24, is prevented from being hindered.

In this embodiment, each rotating element 22 and 24 is passed through—with freedom of rotation—by the respective elongated member 16 in correspondence to the respective pivoting axis X-X and Y-Y. Clearly, in further embodiments of the invention (not shown), the coupling mechanism can comprise one single rotating element that is passed through by an elongated member.

Figure 7:
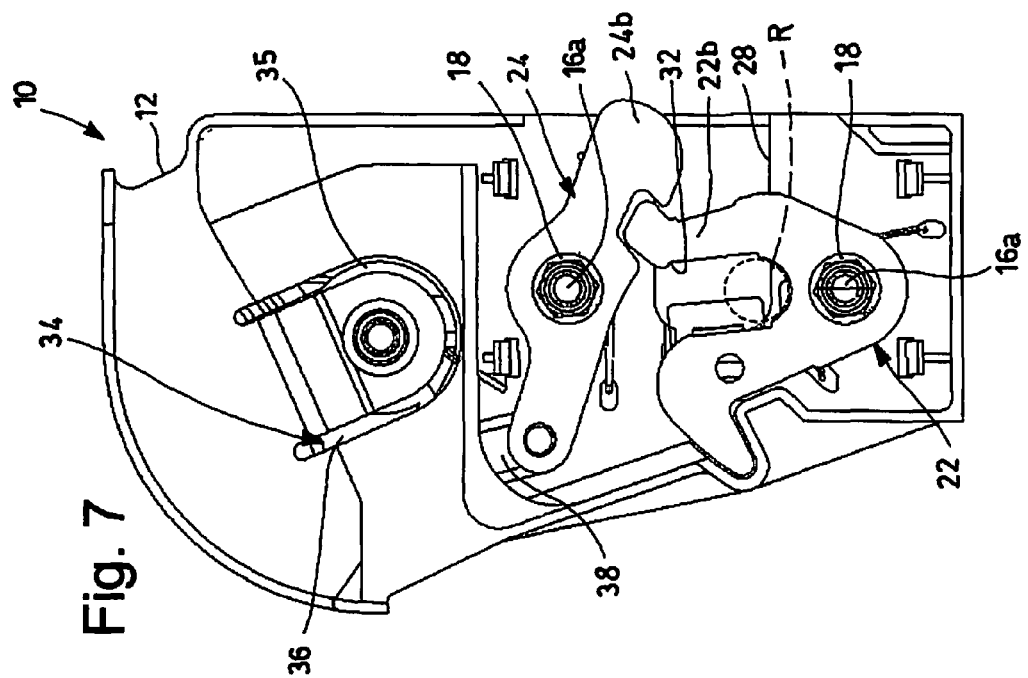
FIGS. 6 and 7 are lateral elevation views of the latch shown in the previous figures, in which the coupling mechanism is shown in two respective and different operating conditions.
Figure 6:
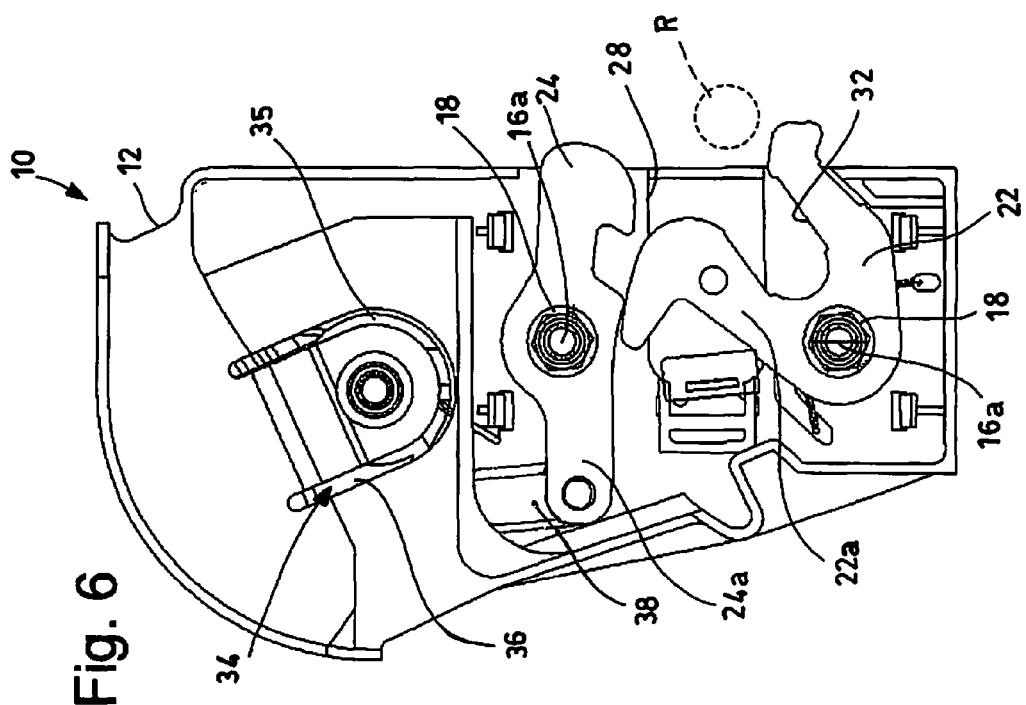
Figure 11:
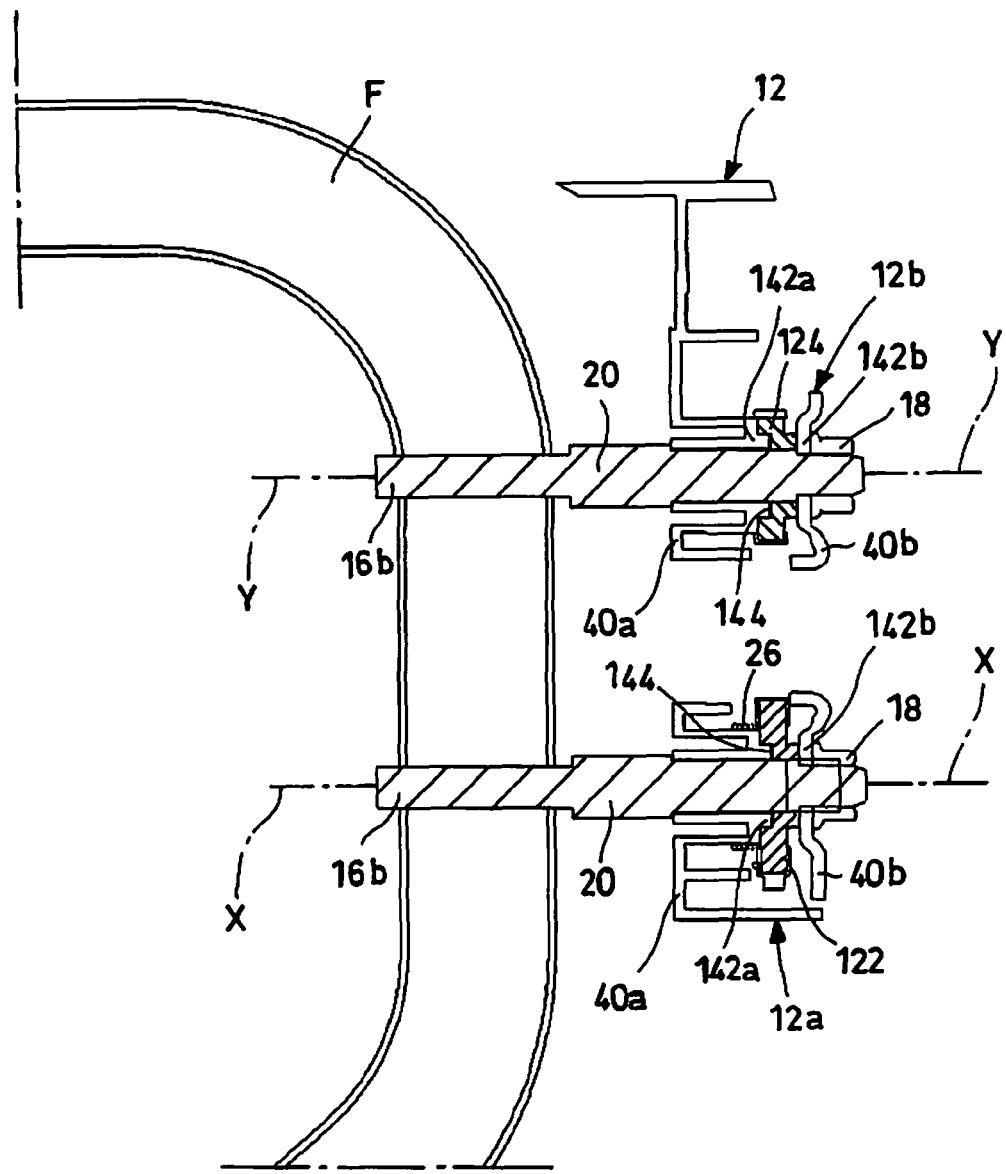
FIG. 11 is a view similar to the one shown in FIG. 8, but it shows the latch manufactured according to the above-mentioned further embodiment shown in FIGS. 9 and 10.

In this embodiment, coupling mechanism 14 is designed to assume two different stable configurations, namely a configuration in which it is decoupled from striker R, shown in FIG. 6, and configuration in which it is coupled to striker R, shown in FIG. 7.

In this embodiment, coupling mechanism 14 comprises a coupling rotating element 22 and a restraining rotating element 24, which are mounted in support structure 12 so as to rotate around a coupling rotation axis X-X and, respectively, a restraining rotation axis Y-Y, whose mode of operation will be described below.

According to this embodiment, the coupling rotation axis X-X associated with coupling rotating element 22 is arranged under restraining rotation axis Y-Y associated with restraining rotating element 24, in particular according to the point of view of an observer who is observing latch 10 when seat S associated therewith is arranged in its substantially straight position.

In this embodiment, coupling rotating element 22 is elastically pre-loaded by a coupling spring 26, which is a torsionally pre-loaded spring, so that coupling rotating element 22 tends to rotate to move from an inactive position (FIG. 6) to an active position (FIG. 7) according to a coupling rotation direction. With reference to the example shown, this movement substantially corresponds to a clockwise rotation around axis X-X performed by coupling rotating element 22, for those observing FIGS. 6 and 7.

In this embodiment, restraining rotating element 24 is elastically pre-loaded by a restraining spring 30, which is a torsionally pre-loaded spring, so that restraining rotating element 24 tends to rotate to move from a release position (FIG. 6) to a locking position (FIG. 7) according to a restraining rotation direction. With reference to the example shown, this movement substantially corresponds to a clockwise rotation around rotation axis Y-Y performed by restraining rotating element 24, for those observing FIGS. 6 and 7.

Preferably, the coupling rotation direction around rotation axis X-X and the restraining rotation direction around rotation axis Y-Y are oriented in the same way (for example, in this embodiment, they are both oriented in a clockwise direction).

With reference to FIG. 6, coupling mechanism 14 is in the decoupled configuration, in which it is decoupled from striker R. In this embodiment, in the decoupled configuration, coupling rotating element 22 is in the inactive position and restraining rotating element 24 is in the release position. Hence, in this configuration, backrest S is decoupled from striker R.

In the inactive position, coupling rotating element 22 is subject to the returning action of coupling spring 26 that causes it to be arranged in a condition in which it faces a window 28 obtained on the rear side and/or laterally in support structure 12, coupling rotating element 22 being suited to receive and be coupled to striker R and, furthermore, to allow the latter to be decoupled. For example, in the facing condition, a seat 32 obtained in coupling rotating element 22 faces window 28 and is suited to receive, on the inside, striker R. Furthermore, in the release position, restraining rotating element 24 is suited not to interfere with the rotation of coupling rotating element 22 towards the inactive position or towards the active position. Vice versa, in this decoupled configuration, coupling rotating element 22 is designed so as to prevent, for example by means of the cooperation of complementary profiles mechanically interfering with one another, restraining rotating element from rotating towards the locking position, thus countering the action of restraining spring 30.

In this embodiment, in particular with reference to FIG. 6, said complementary profiles are supported by:
- a first arm 22*a* of coupling rotating element 22, which is shaped as a rocker arm (especially with arms with a curved shape), and
- a first arm 24*a* of restraining rotating element 24, which is shaped as a rocker arm, as well.

Starting from the above-mentioned decoupled configuration, when backrest S is reclined backwards in the substantially straight position, striker R passes through window 28, thus forcedly pushing coupling rotating element 22 towards the active position against the action of coupling spring 26.

In the active position, coupling rotating element 22 is moved away from window 28, thus receiving and being coupled to striker R, for example inside seat 32. At the same time, after having been moved to the active position, coupling rotating element 22 is designed not to interfere with the rotation of restraining rotating element 24 towards the locking position or towards the release position, for example by separating the above-mentioned complementary profiles that previously interfered with one another. Therefore, restraining rotating element 24 is able to move to the locking position due to the action of restraining spring 30. Vice versa, when restraining rotating element 24 reaches the locking position, it is designed so as to prevent, for example by means of the interaction of further complementary profiles mechanically interfering with one another, coupling rotating element 22 from rotating towards the inactive position, thus countering the action of coupling spring 26.

In this embodiment, in particular with reference to FIG. 7, said further complementary profiles are supported by:

a second arm 22b (provided with a distal projection) of coupling rotating element 22, which is shaped as a rocker arm, and a second arm 24b (provided with an intermediate recess shaped so as to house the distal projection) of restraining rotating element 24, which is shaped as a rocker arm, as well.

In particular, the first arms 22a and 24a of the rocker arms created by coupling rotating element 22 and by restraining rotating element 24, respectively, are operatively arranged in front of the second arms 22b and 24b. In other words, the first arms 22a and 24a, in use, pivot in a position that is father from the baggage compartment relative to the other arms 22b and 24b.

Therefore, coupling mechanism 14 is in the configuration in which it is coupled to striker R, in particular in which coupling rotating element 22 is in the active position and restraining rotating element 24 is in the locking position. Hence, in this configuration, backrest S is firmly constrained to striker R.

In particular, in this step, striker R is housed in seat 32, which is preferably made as a cove arranged between curved arms 22a and 22b supported by the rocker arms defined by coupling rotating element 22.

Starting from the above-mentioned coupled configuration, when restraining rotating element 24 is forcedly rotated (in a manually or automatically controlled manner) towards the release position, it is not countered by coupling rotating element 22. On the other hand, coupling rotating element 22 is freed from the constraint with restraining rotating element 24, for example by separating the further complementary profiles mechanically interfering with one another. In this way, coupling rotating element 22 is allowed to move from the active position to the inactive position due to the action of coupling spring 26. At the end of the forced action performed by restraining rotating element 24, the latter tends to be caused to return towards the locking position by restraining spring 30. Though, coupling rotating element 22, which is in its active position, is designed so as to prevent, for example by means of the cooperation of complementary profiles mechanically interfering with one another, restraining rotating element 24 from rotating towards the locking position, thus countering the action of restraining spring 30.

Hence, in this situation, coupling mechanism 14 is, again, in the configuration in which it is decoupled from striker R.

In this embodiment, latch 10 is provided with a release member 34, which is mounted on support structure 12 so as to be mobile and is suited to manually control coupling mechanism 14, in order to control its passage from the coupled configuration to the decoupled configuration. In particular, release member 34 is constrained to restraining rotating element 24 so that, after a manual activation of release member 34 (operating position), restraining rotating element 24 is temporarily moved from the locking position to the release position against the action of restraining spring 30, when coupling rotating element 22 is in the active position.

Preferably, release member 34 is countered by a return spring 35, which is torsionally pre-loaded and tends to cause it to return to a rest position, namely a position corresponding to the coupled configuration of coupling mechanism 14, in particular to the locking position of restraining rotating element 24.

In particular, release member 34 comprises a lever 36, which is mounted to as to rotate around a release rotation axis Z-Z, in order to be manually accessible from the outside of support structure 12 for a user. Lever 36 is constrained to coupling mechanism 14 so as to control its passage from the coupled configuration to the decoupled configuration, when the lever moves from the rest position to the operating position, for example against the action of return spring 35.

In particular, release rotation axis Z-Z is parallel to rotation axes X-X and Y-Y associated with rotating elements 22 and 24 of coupling mechanism 14. Preferably, release rotation axis Z-Z is arranged above rotation axes X-X and Y-Y associated with the coupling mechanism, for an observer who is observing latch 10 when seat S associated therewith is arranged in its substantially straight position.

In this embodiment, lever 36 is constrained to restraining rotating element 24, so as to cause it to pivot towards the release position, when the lever is rotated around axis Z-Z in a release rotation direction (e.g. oriented according to a counterclockwise direction for those observing FIGS. 6 and 7) in the operating position, in particular against the action of return spring 35. Preferably, for this purpose, the latch comprises a rigid body 38, which, for example, is hinged, on one side, to lever 36 (in particular in a position that is eccentric thereto) and, on the other side, to restraining rotating element 24. This determines a rotation constraint between lever 36 and rigid body 38. In particular, the above-mentioned hinges are built around axes that are parallel to axis Z-Z.

In this embodiment, rigid body 38 is an oblong bar, in particular having, at the ends, a pair of pins (not numbered), which project transversely and are coupled, with freedom of rotation, to lever 36 and restraining rotating element 24. In this way, rigid body 38 substantially acts as a strut, which is stressed in compression due to the manually forced pivoting of lever 36 combined with the action performed by the spring associated with restraining rotating element 24.

FIG. 8 shows some manufacturing details of this embodiment. In particular, FIG. 8 shows how the above-mentioned at least one rotating element 22, 24 is supported, during its rotation, by lateral walls 40a and 40b of support structure 12, which is manufactured as a hollow casing suited to enclose coupling mechanism 14.

In particular, said lateral walls 40 and 40b transversely face one another (i.e. in a parallel direction relative to the respective rotation axis X-X or Y-Y), thus defining a hollow space in which the above-mentioned at least one rotating element 22 and 24 is supported during its rotation.

In this embodiment, the above-mentioned at least one rotating element 22 and 24 is supported by a pair of abutments 42a and 42b, which are internally borne by the lateral walls 40 and 40b, respectively. Preferably, abutments 42a and 42b project towards the inside of the hollow space defined by support structure 12. In alternative embodiments (not shown), one or both abutments 42a and 42b can be manufactured as inwardly re-entering—or flush—relative to lateral walls 40a and 40b, thus correspondingly adapting the shape of rotating elements 22 and 24 associated therewith.

In this embodiment, the above-mentioned at least one rotating element 22, 24 and at least one of abutments 42a and 42b at least partially penetrate one another, with a mutual freedom of rotation, in a transverse direction (namely in a direction that is parallel to the respective rotation axis X-X or Y-Y). In particular, rotating element 22, 24 laterally has, on one side, a recess 44, in which there is inserted abutment 42 projecting from the transversely outer later wall 40b. In further embodiments (not shown), there can be a further recess, which is arranged in an opposite position relative to recess 44 and is adapted to house the other abutment 42a.

In this embodiment, both rotating elements 22 and 24 are supported, during their rotation, by the inner walls of support structure 12, substantially in accordance with what described above.

According to alternative embodiments, which are not shown, the above-mentioned at least one rotating element can be supported, during its rotation, by a respective bushing, which is properly constrained by the support structure, for example between lateral walls transversely facing one another. In this case, the elongated members can be manufactured so as to extend through the support structure and be inserted, with freedom of rotation, into the bushings. Clearly, this configuration can be adopted also providing a plurality of bushings that can be associated with a corresponding plurality of rotating elements.

Figure 4:
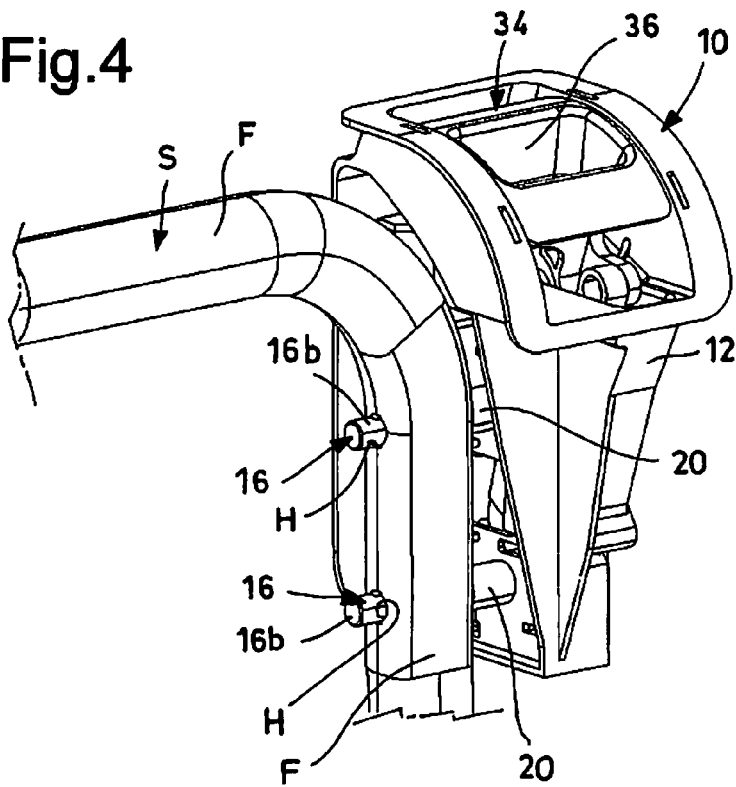
FIG. 4 is a prospective view similar to the one of FIG. 2, but in which the latch is shown from another angle.

In the embodiment described above, as one can especially assume from FIG. 4, elongated members 16 transversely intersect the box-like or tubular segments of frame F so as to be substantially aligned parallel to the longitudinal axis of the segments themselves, when latch 10 is mounted on seat S. In particular, elongated members 16, in their extension through the box-like or tubular segments of frame F, transversely—preferably perpendicularly—cross the longitudinal axis of these segments.

When the above-mentioned at least one rotating element 22, 24 of coupling mechanism 14 is supported, during is rotation, by support structure 12, regardless of the installation of the above-mentioned at least one elongated member 16 through the latter, latch 10 can be mounted in a more flexible and adjustable manner.

According to an alternative solution to mount latch 10 on frame F of the backrest, it is possible to:

provide a latch 10 of the type described above, but in the form a pre-assembled assembly comprising support structure 12 and coupling mechanism 14, which, though, is decoupled from the above-mentioned at least one elongated member 16;

couple the at least one elongated member 16 to frame F, for example by inserting portion 16b through the pair of aligned holes H and by firmly and directly connecting it to frame F itself; and subsequently assemble latch 10 in the at least one elongated member 16 already coupled to frame F, for example by inserting portion 16a through the pair of aligned openings (not numbered) and by firmly and directly connecting it to support structure 12.

According to an alternative mounting solution, it is possible to:

provide a latch 10 of the type described above, which comprises support structure 12 and coupling mechanism 14 and is also already coupled to elongated member 16 (for example through portion 16a); and couple latch 10, provided with elongated member 16, to frame F, for example by inserting portion 16b through the pair of aligned holes H and by firmly and directly connecting it to frame F itself.

In this embodiment, at least one of springs 26, 30 and 35 is made of steel, for example of the SH class.

In this embodiment, lever 36 and/or rigid body 38 is made of a polymer material, for example of the thermoplastic type (such as polyamide). In particular, the above-mentioned polyamide comprises nylon, for example of the PA6 type.

With reference, in particular, to the figures from 9 to 11, number 110 indicates, as a whole, a latch manufactured according to a further preferred explanatory embodiment of the present invention.

Details and elements that are similar to those of the embodiment described above or fulfill a similar function are associated with the same alphanumeric references. For the sake of brevity, the description of these details and elements will not be repeated below, but reference is made to what was previously explained in the description of the first embodiment.

In this embodiment, one of the main distinctive signs, compared to the embodiment described above, is offered by the coupling mechanism, which, in this case, is indicated by number 114.

In particular, coupling mechanism 114 comprises a pair of rotating elements 122, 124, which cooperate with one another, in the coupled configuration (FIG. 9) and in the decoupled configuration (FIG. 10), by means of features that are structurally different from the first embodiment.

In this embodiment, the restraining spring, in this case indicated with number 130, is a pull pre-loaded spring, which tends to hold restraining rotating element 124 in the position shown in FIG. 9.

Unlike the embodiment described above, in the coupled configuration of coupling mechanism 114, restraining rotating element 124 is designed in such a way that allows it to create, at the front (relative to the respective rotation axes X-X and Y-Y), an interference with the complementary profile of coupling rotating element 122. On the contrary, in the embodiment described above, in the coupled configuration shown in FIG. 7, the further complementary profiles of restraining rotating element 24 and of coupling rotating element 22 create an interference on the rear side (relative to the respective rotation axes X-X and Y-Y), thus preventing coupling rotating element 22 from returning to the position suited to expel striker R.

Furthermore, in this embodiment, the cooperation by means of interference between restraining rotating element 124 and coupling rotating element 122 is substantially of the ratchet gear type, which, in its principle, is substantially similar to the corresponding ratchet gear described in the embodiment shown in the figures from 1 to 8. In particular, restraining rotating element 124 has a radially projecting tooth 124a and coupling rotating element 122 respectively has a recess 122a, which is complementary to said tooth 124a.

In this embodiment, the structure of elongated members 16 and the way in which they are connected between support structure 12 and frame F of seat S are substantially the same as the ones shown by the previous embodiment.

As to the way in which rotating elements 122, 124 are mounted relative to lateral walls 40a and 40b of the support structure, the position and shape of abutments 142a and 142b is optionally reversed compared to the one of the embodiment described above. In other words, recess 144 faces the transversely inner lateral wall 40a, from which abutment 142a penetrating recess 144 transversely projects outwards, so as to allow a mutual freedom of rotation. Though, the configuration described above can be subject to changes, since it can be modified based on the technical teaches described above with reference to the embodiment shown in the figures from 1 to 8.

As a person skilled in the art can clearly assume from the present description, the technical features characterizing the different versions and embodiments described and illustrated above can freely be replaced with one another, provided that they are compatible.

Naturally, the principle of the present invention being set forth, the embodiments and the implementation details can be widely changed with respect to what described above and shown in the drawings as a mere way of non-limiting example.

As a person skilled in the art can clearly understand, the principle of the invention can be applied to latches having a coupling mechanism that differs from the one described above and, for example, is provided with mobile elements that cooperate differently compared to the coupling and restraining rotating elements shown in the figures.

Furthermore, a skilled person can also understand that the release member can be manufactured and conceived so as to be different from the one described above by the of example. For example, the release member can be replaced by or combined with an actuation system of a different type, either manual or automatic. In particular, this actuation system that can replace or be added to the release member can use—in a manner known in this technical field—a Bowden cable or an actuator or an electric motor cooperating with the coupling mechanism. This actuation system can be remotely controlled relative to the position in which the latch is located, for example directly from the dashboard or from the baggage compartment itself, without in this way going beyond the scope of protection provided by the invention.

The invention claimed is:

1. A latch for a reclining backrest of a seat of a vehicle; said latch comprising:
    a casing fitted to a frame of said backrest;
    a coupling mechanism housed in the casing, associated with said casing and coupled to a fixed striker in a releasable manner when said backrest is in a substantially straight position; and
    at least one elongated member comprising a spacer positioned intermediate the casing and the frame, which is adapted to pass through said casing; said spacer being, on one side, adapted to be firmly and directly coupled to the casing and, on the other side, adapted to be firmly and directly coupled to said frame without obstructing operation of said coupling mechanism.

2. A latch according to claim 1, wherein the coupling of said at least one elongated member to said casing and/or to said frame is obtained by screwing, riveting, clinching or welding.

3. A latch according to claim 1, wherein the direct connection between said at least one elongated member and said casing is obtained by constraining a portion of said elongated member to said casing; said portion projecting towards the outside of said casing.

4. A latch according to claim 1, wherein the direct connection between said at least one elongated member and said frame is obtained by constraining a portion of said at least an elongated member to said frame; said portion protecting towards the outside of said frame.

5. A latch according to claim 3, wherein said spacer is arranged in an intermediate position between said portion and a further portion and is wider with respect to said portion and said further portion.

6. A latch according to claim 1, wherein said mechanism comprises at least one rotating element, which rotates around a respective pivoting axis; said at least one rotating element being passed through, with freedom of rotation, by said at least one elongated member in correspondence to said pivoting axis.

7. A latch according to claim 6, wherein said at least one rotating element is supported, during its rotation, by said lateral walls of said casing.

8. A latch according to claim 7, wherein said at least one rotating element and at least one abutment supported by at least one of said lateral walls at least partially penetrate one another with a mutual freedom of rotation.

9. A seat comprising a latch according to claim 1.

10. A latch according to claim 1, wherein the casing comprises a laterally open hollow body, which is closed by a lid or plate and laterally fixed to the lid or plate with the coupling mechanism intermediate the hollow body and the coupling mechanism.

\* \* \* \* \*